(12) United States Patent
John et al.

(10) Patent No.: US 12,135,570 B2
(45) Date of Patent: Nov. 5, 2024

(54) THERMOSTAT MIXING VALVE WITH DUAL PROPORTIONAL SOLENOID VALVES

(71) Applicant: B/E AEROSPACE, INC., Winston Salem, NC (US)

(72) Inventors: Poly John, Bangalore (IN); Mahammadrafi Bagawan, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 21 days.

(21) Appl. No.: 17/737,844

(22) Filed: May 5, 2022

(65) Prior Publication Data
US 2023/0043594 A1 Feb. 9, 2023

(30) Foreign Application Priority Data

Aug. 9, 2021 (IN) .............................. 202141035946

(51) Int. Cl.
*G05D 23/19* (2006.01)
*B64D 11/00* (2006.01)

(52) U.S. Cl.
CPC ......... *G05D 23/1919* (2013.01); *B64D 11/00* (2013.01)

(58) Field of Classification Search
CPC .... B64D 11/02; B64D 11/00; G05D 23/1393; G05D 23/1919
See application file for complete search history.

(56) References Cited

U.S. PATENT DOCUMENTS

| 2,844,320 A | * | 7/1958 | Cate ...................... F16K 31/025 236/80 R |
| 3,023,996 A | * | 3/1962 | Robertson ............. F16K 31/365 251/38 |
| 3,469,590 A | * | 9/1969 | Barker ...................... F23N 5/14 236/78 D |

(Continued)

FOREIGN PATENT DOCUMENTS

| CN | 108980441 | 12/2018 |
| EP | 3584665 | 12/2019 |

(Continued)

OTHER PUBLICATIONS

European Patent Office, European Search Report dated Dec. 12, 2022 in Application No. 22188375.4.

(Continued)

*Primary Examiner* — Jessica Cahill
(74) *Attorney, Agent, or Firm* — SNELL & WILMER L.L.P.

(57) ABSTRACT

A thermostat mixing valve for a water temperature control system may comprise a mixing chamber defining a valve outlet, a first proportional solenoid valve fluidly coupled to the mixing chamber, and a second proportional solenoid valve fluidly coupled to the mixing chamber. Each of the first proportional solenoid valve and the second proportional solenoid valve may include a housing assembly defining a fluid inlet and a fluid outlet, a plunger assembly configured to translate relative to the housing assembly, and a coil assembly configured to generate a magnetic field that translates the plunger assembly.

16 Claims, 7 Drawing Sheets

(56) References Cited

U.S. PATENT DOCUMENTS

| | | | | |
|---|---|---|---|---|
| 3,802,623 | A * | 4/1974 | McIntosh | G05D 23/136 251/35 |
| 4,540,154 | A * | 9/1985 | Kolchinsky | F16K 31/408 335/278 |
| 5,469,888 | A * | 11/1995 | McAlister | F16K 11/078 137/625.68 |
| 5,579,741 | A * | 12/1996 | Cook | F02M 25/0836 251/129.05 |
| 10,088,063 | B2 | 10/2018 | Lopez Rodriguez | |
| 10,429,865 | B2 * | 10/2019 | Ono | F16K 11/22 |
| 10,677,371 | B2 * | 6/2020 | Kaas | H01F 7/1615 |
| 11,040,318 | B2 | 6/2021 | Salas Arranz et al. | |
| 11,193,600 | B2 * | 12/2021 | Wang | F16K 11/22 |
| 2006/0138246 | A1 * | 6/2006 | Stowe | E03C 1/05 236/12.12 |
| 2006/0244472 | A1 * | 11/2006 | Hayashi | G01R 31/2874 324/750.08 |
| 2008/0230624 | A1 * | 9/2008 | Giles | F16K 31/0655 239/69 |
| 2012/0330468 | A1 * | 12/2012 | Lopez Rodriguez | F16K 11/24 4/677 |
| 2019/0381464 | A1 | 12/2019 | Salas Arranz et al. | |
| 2020/0123747 | A1 * | 4/2020 | Frackelton | E03C 1/057 |

FOREIGN PATENT DOCUMENTS

| | | |
|---|---|---|
| JP | 2017226999 | 12/2017 |
| WO | 9322714 | 11/1993 |
| WO | 2008112930 | 9/2008 |

OTHER PUBLICATIONS

European Patent Office, European Office Action dated Mar. 6, 2024 in Application No. 22188375.4.

* cited by examiner

THERMOSTAT MIXING VALVE WITH DUAL PROPORTIONAL SOLENOID VALVES

CROSS-REFERENCE TO RELATED APPLICATIONS

This application claims priority to, and the benefit of, U.S. Provisional Application Serial No. 202141035946, filed Aug. 9, 2021, and titled "THERMOSTAT MIXING VALVE WITH DUAL PROPORTIONAL SOLENOID VALVE," which is incorporated by reference herein in its entirety for all purposes.

FIELD

The present disclosure relates to thermostat mixing valves and, in particular, to a thermostat mixing valve having dual proportional solenoid valves.

BACKGROUND

Aircraft lavatory faucets provide potable water for handwashing. The temperature of the water supplied to the faucet is generally controlled by a thermostat mixing valve, which controls the mixing, or blending, of hot water and cold water to achieve a desired water temperature. Current thermostat mixing valves are generally mechanically operated valves (e.g., the valves operate without employing electrical signals).

SUMMARY

A thermostat mixing valve for a water temperature control system is disclosed herein. In accordance with various embodiments, the thermostat mixing valve may comprise a mixing chamber defining a valve outlet, a first proportional solenoid valve fluidly coupled to the mixing chamber, and a second proportional solenoid valve fluidly coupled to the mixing chamber. Each of the first proportional solenoid valve and the second proportional solenoid valve may include a housing assembly defining a fluid inlet and a fluid outlet, a plunger assembly configured to translate relative to the housing assembly, and a coil assembly configured to generate a magnetic field. The magnetic field is configured to translate the plunger assembly.

In various embodiments, the plunger assembly may comprise a plunger comprising a ferrous material, a poppet coupled to the plunger, a seal coupled to the poppet, and a biasing member configured to bias the plunger toward the fluid outlet. In various embodiments, an end portion of the poppet comprises at least one of a frustoconical shape or a conical shape.

In various embodiments, the housing assembly may include a valve housing and a coil housing. The valve housing may include a seal seat. The coil assembly may include a solenoid coil helically wrapped around the coil housing. In various embodiments, the seal seat is configured to form a fluid tight seal with the seal of the plunger assembly.

In various embodiments, the mixing chamber may include a valve manifold fluidly coupled to the first proportional solenoid valve and to the second proportional solenoid valve. In various embodiments, the valve manifold may define a first fluid channel fluidly coupled to the fluid outlet of the first proportional solenoid valve, a second fluid channel fluidly coupled to the fluid outlet of the second proportional solenoid valve, a plurality of first openings fluidly coupling the first fluid channel to a mixing volume defined by the mixing chamber, and a plurality of second openings fluidly coupling the second fluid channel to the mixing volume.

A water temperature control system for an aircraft faucet system is also disclosed herein. In accordance with various embodiments, the water temperature control system may comprise a thermostat mixing valve including a mixing chamber, a first proportional solenoid valve fluidly coupled to the mixing chamber, and a second proportional solenoid valve fluidly coupled to the mixing chamber. A controller may be operably coupled to the first proportional solenoid valve and the second proportional solenoid valve. A temperature sensor may be configured to measure a temperature of water output from the thermostat mixing valve and send a measured temperature signal to the controller. A temperature input device may be configured to send a desired temperature signal to the controller. The controller may be configured to determine a first command to send to the first proportional solenoid valve and a second command to send to the second proportional solenoid valve based on a comparison of the desired temperature signal to the measured temperature signal.

In various embodiments, the first proportional solenoid valve may include a first housing assembly, a first plunger assembly configured to translate relative to the first housing assembly, and a first coil assembly configured to generate a first magnetic field. The first housing assembly may define a first fluid inlet, a first fluid outlet, and a first seal seat. The first fluid outlet may be fluidly coupled to the mixing chamber. The first magnetic field is configured to translate the first plunger assembly.

In various embodiments, the first plunger assembly may comprise a first plunger comprising a ferrous material, a first poppet coupled to the first plunger, a first seal coupled to the first poppet, and a first biasing member configured to bias the first seal toward the first seal seat. In various embodiments, an edge of the first seal seat may be configured to deform the first seal and form a first sealing interface with the first seal.

In various embodiments, the first coil assembly may include a first solenoid coil and a first solenoid electronics unit configured to receive the first command and control a pulse width modulated voltage signal provided to the first solenoid coil. The first command may correspond to a first duty cycle. In various embodiments, increasing the first duty cycle increases an area defined between the edge of the first seal seat and an outer circumferential surface of the first poppet.

In various embodiments, the second proportional solenoid valve may include a second housing assembly defining a second fluid inlet, a second fluid outlet, and a second seal seat, the second fluid outlet being fluidly coupled to the mixing chamber. The second proportional solenoid valve may further include a second plunger comprising a ferrous material, a second poppet coupled to the second plunger, a second seal coupled to the second poppet, a second biasing member configured to bias the second seal toward the second seal seat, and a second coil assembly configured to generate a second magnetic field. The second magnetic field is configured to translate the second plunger away from the second seal seat.

In various embodiments, the second coil assembly may include a second solenoid coil, and a second solenoid electronics unit configured to receive the second command and control a second pulse width modulated voltage signal provided to the second solenoid coil. The second command may correspond to a second duty cycle. In various embodiments, decreasing the second duty cycle decreases an area defined between an edge of the second seal seat and an outer circumferential surface of the second poppet.

An article of manufacture including a tangible, non-transitory computer-readable storage medium having instructions stored thereon for controlling a temperature of water output from a thermostat mixing valve is also disclosed herein. In accordance with various embodiments, the instructions, in response to execution by a controller, cause the controller to perform operations, which comprise receiving, by the controller, a desired temperature signal from a temperature input device; receiving, by the controller, a measured temperature signal from a temperature sensor, the temperature sensor being configured to measure the temperature of the water output from the thermostat mixing valve; comparing, by the controller, the desired temperature signal to the measured temperature signal; determining, by the controller, a first duty cycle for a first proportional solenoid valve of the thermostat mixing valve and a second duty cycle for a second proportional solenoid valve of the thermostat mixing valve; sending, by the controller, a first command corresponding to the first duty cycle to the first proportional solenoid valve; and sending, by the controller, a second command corresponding to the second duty cycle to the second proportional solenoid valve.

In various embodiments, each of the first proportional solenoid valve and the second proportional solenoid valve may comprise a housing assembly defining a fluid inlet, a fluid outlet, and a seal seat; a plunger comprising a ferrous material; a poppet coupled to the plunger; a seal coupled to the poppet; a biasing member configured to bias the seal toward the seal seat; and a coil assembly configured to generate a magnetic field. The magnetic field is configured to translate the plunger.

In various embodiments, increasing the first duty cycle may increase an area between an edge of the seal seat of the first proportional solenoid valve and an outer circumferential surface of the poppet of the first proportional solenoid valve. Decreasing the first duty cycle may decrease the area between the edge of the seal seat of the first proportional solenoid valve and the outer circumferential surface of the poppet of the first proportional solenoid valve.

In various embodiments, increasing the second duty cycle may increase an area between an edge of the seal seat of the second proportional solenoid valve and an outer circumferential surface of the poppet of the second proportional solenoid valve. Decreasing the second duty cycle may decrease the area between the edge of the seal seat of the second proportional solenoid valve and the outer circumferential surface of the poppet of the second proportional solenoid valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

Disclosed herein, according to various embodiments, is a thermostat mixing valve that includes dual proportional solenoid valves, a water temperature control system employing the disclosed thermostat mixing valve assembly, and a process for controlling the water temperature output from the thermostat mixing valve. Although details and examples are included herein pertaining to implementing the thermostat mixing valve assembly in a faucet system for an aircraft lavatory, the present disclosure is not necessarily so limited, and thus aspects of the disclosed embodiments may be adapted for performance in a variety of other industries. As such, numerous applications of the present disclosure may be realized.

Figure 1:
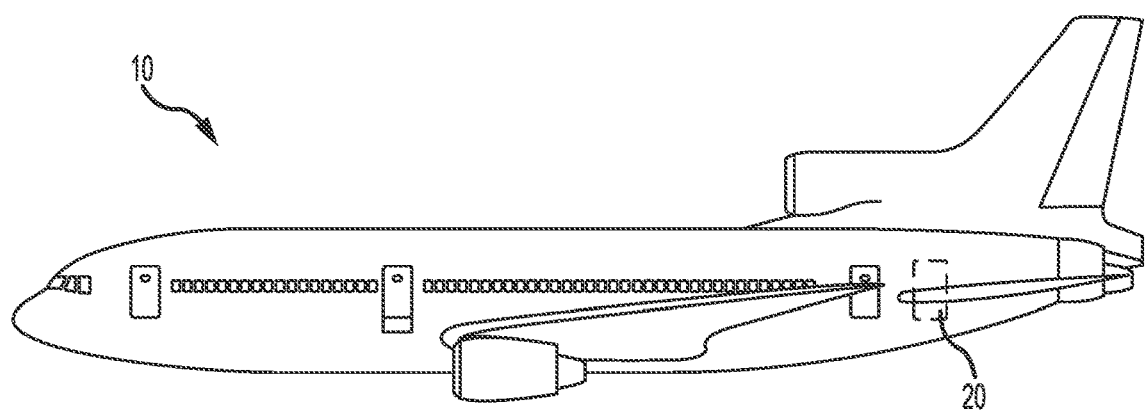
FIG. 1 illustrates an aircraft having a lavatory, in accordance with various embodiments.
Figure 2:
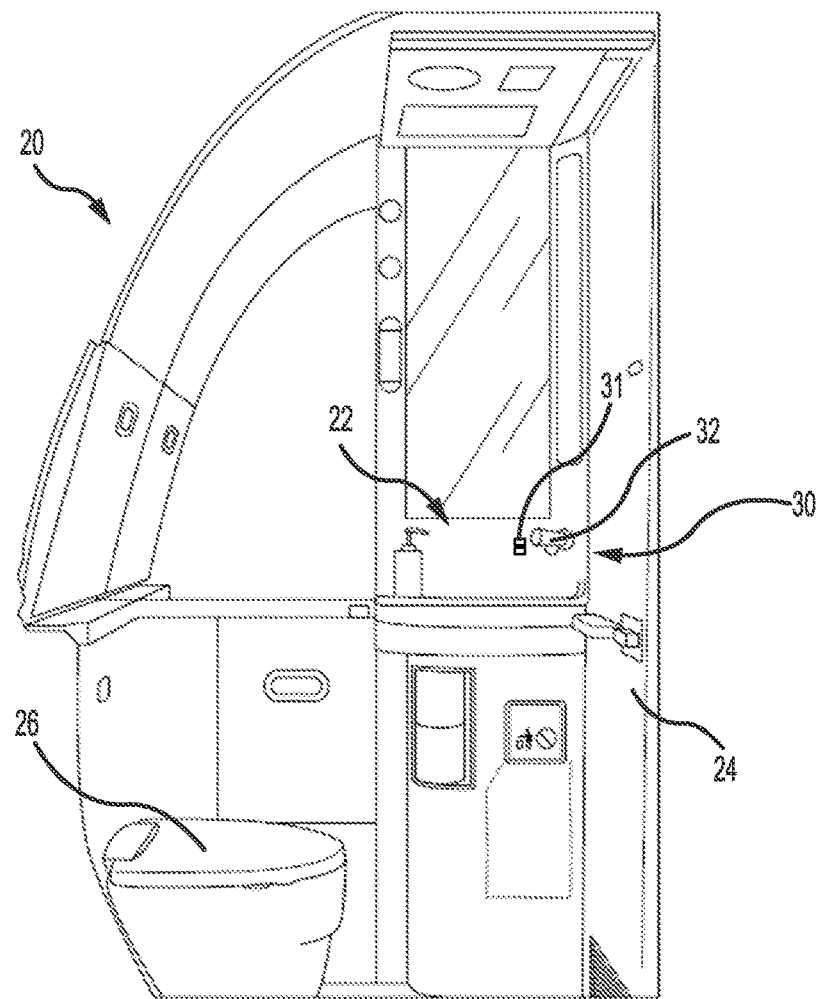
FIG. 2 illustrates a perspective view of an aircraft lavatory, in accordance with various embodiments.
Figure 3:
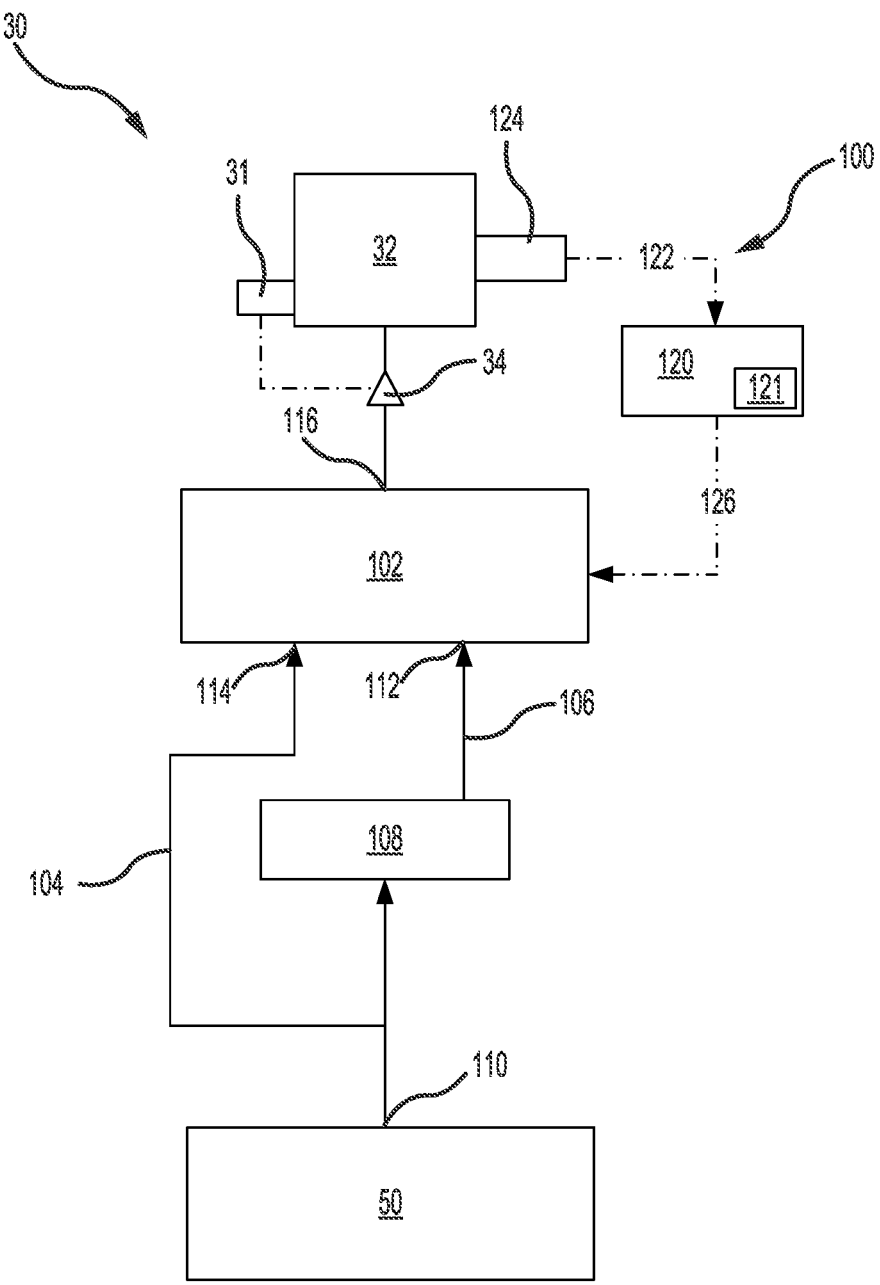
FIG. 3 illustrates a schematic of a faucet system having a water temperature control system, in accordance with various embodiments.

In various embodiments, and with reference to FIGS. 1 and 2, an aircraft 10 may include aircraft lavatory 20. The aircraft lavatory 20 may include a washbasin (e.g., a sink) 22, a door 24, and a toilet 26, among other features. The washbasin 22 includes a faucet system 30. FIG. 3 illustrates a schematic of faucet system 30. With combined reference to FIG. 2 and FIG. 3, in various embodiments, faucet system 30 may be electronically operated. For example, faucet system 30 may include one or more sensor(s) 31 configured to sense when an object (e.g., a hand) is located under a faucet nozzle (or faucet manifold) 32 of faucet system 30. A main faucet valve 34 may be actuated from a closed position to an open position, in response to the sensors 31 determining an object is under faucet nozzle 32. When the main faucet valve 34 is in the open position, water flows out faucet nozzle 32. When the main faucet valve 34 is in the closed position, water is blocked, or otherwise prevented from flowing out faucet nozzle 32. While described as electronically operated, it is contemplated and understood that faucet nozzle 32 may be manually operated. For example, faucet system 30 may include a lever, knob, switch, button, or other structure located on faucet nozzle 32 or washbasin 22 and configured to be manually operated by a user (i.e., person) to translate the main faucet valve 34 between the open position and the closed position.

Faucet nozzle 32 receives water from a potable water source 50. In accordance with various embodiments, faucet system 30 includes a water temperature control system 100. Water temperature control system 100 is configured to control a temperature of the water provided to faucet nozzle 32. Water temperature control system 100 includes a thermostat mixing valve 102. Thermostat mixing valve 102 is located between potable water source 50 and main faucet valve 34. Stated differently, thermostat mixing valve 102 is downstream of potable water source 50 and upstream of main faucet valve 34. Stated yet another way, fluid (e.g., water) flows from potable water source 50 to thermostat mixing valve 102 and from thermostat mixing valve 102 to main faucet valve 34.

In accordance with various embodiments, thermostat mixing valve 102 receives cold water (e.g., water at a first temperature) from potable water source 50 via a cold water (or first) conduit 104. Thermostat mixing valve 102 receives hot water (e.g., water at a second temperature greater than the first temperature) from potable water source 50 via a hot water (or second) conduit 106. A temperature of the water in hot water conduit 106 is increased, relative to a temperature of the water output from potable water source 50, by a heater 108. Heater 108 is located between an outlet 110 of potable water source 50 and a hot water inlet 112 of thermostat mixing valve 102. Heater 108 is configured to increase a temperature of the water output from potable water source 50. In this regard, a temperature of the water input at hot water inlet 112 of thermostat mixing valve 102 is greater than a temperature of the water output at outlet 110 of potable water source 50. The temperature of the water input at hot water inlet 112 of thermostat mixing valve 102 is also greater than a temperature of the water input into a cold water inlet 114 of thermostat mixing valve 102. Water from cold water conduit 104 is input into thermostat mixing valve 102 via cold water inlet 114.

As described in further detail below, the water from cold water conduit 104 and the water from hot water conduit 106 are mixed in thermostat mixing valve 102. The mixture is output from an outlet 116 of thermostat mixing valve 102 and is provided to faucet nozzle 32 via main faucet valve 34. The temperature of the water output from thermostat mixing valve 102 is regulated, or controlled, by a controller 120 of water temperature control system 100.

Controller 120 may include a general-purpose processor, a digital signal processor (DSP), an application specific integrated circuit (ASIC), a field programmable gate array (FPGA), or some other programmable logic device, discrete gate or transistor logic, discrete hardware components, or any combination thereof. A tangible, non-transitory computer-readable storage medium 121 may be in communication with controller 120. The storage medium 121 may comprise any tangible, non-transitory computer-readable storage medium known in the art. The storage medium 121 has instructions stored thereon that, in response to execution by controller 120, cause controller 120 to perform operations related to controlling thermostat mixing valve 102.

Controller 120 may receive a desired temperature signal 122 from a temperature input device 124. Temperature input device 124 is configured to allow an operator to set a desired temperature for faucet system 30. For example, the aircraft operator may set the desired temperature of faucet system 30, or the desired temperature may be selected by individual users of faucet system 30. As used herein, the "desired temperature" refers to the desired temperature for water output from faucet nozzle 32. Temperature input device 124 may comprise a touchpad, knob, button, lever, or any other device capable of allowing a desired temperature for faucet system 30 to be selected. Controller 120 may send commands 126 to thermostat mixing valve 102 configured to cause the temperature of the water output from thermostat mixing valve 102 to equal, or almost equal, the desired temperature. As used in the previous context only, "almost equal" means±1° Celsius (C).

Figure 4A:
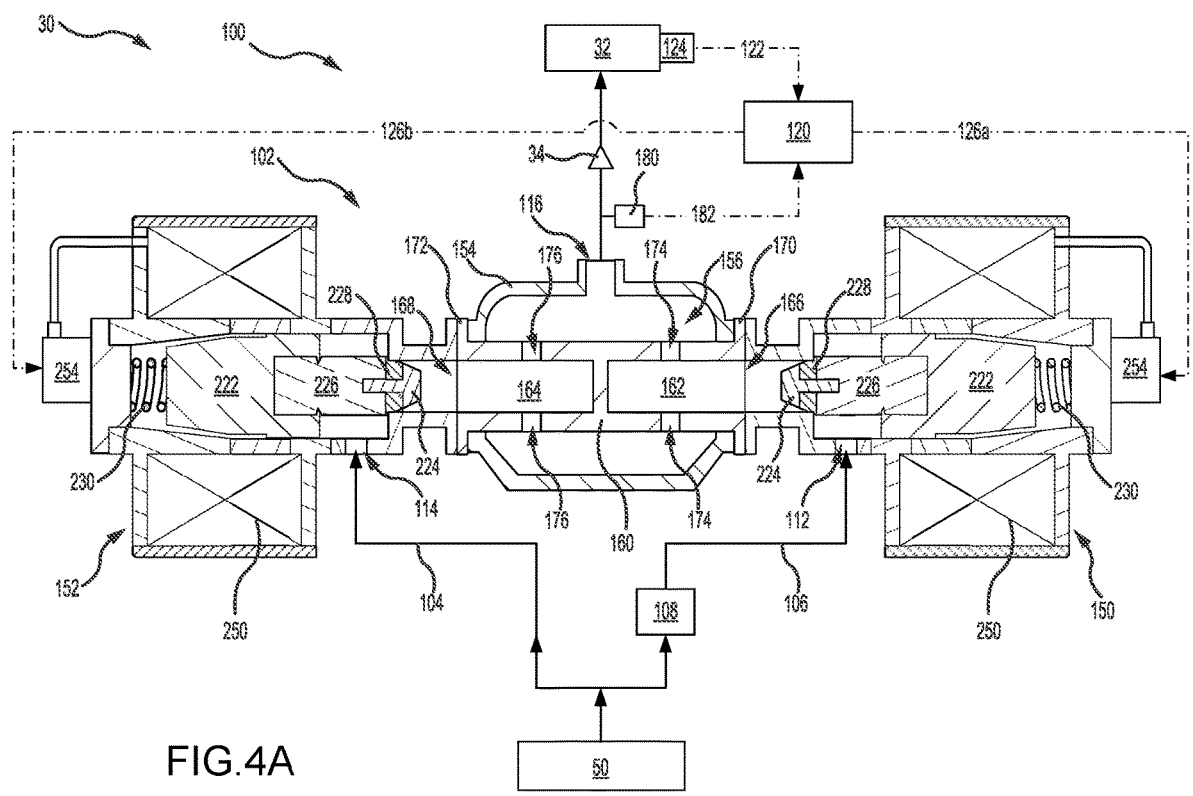
FIG. 4A illustrates a water temperature control system having a thermostat mixing valve that includes dual proportional solenoid valves, with the dual proportional solenoid valves in a closed position, in accordance with various embodiments.
Figure 4B:
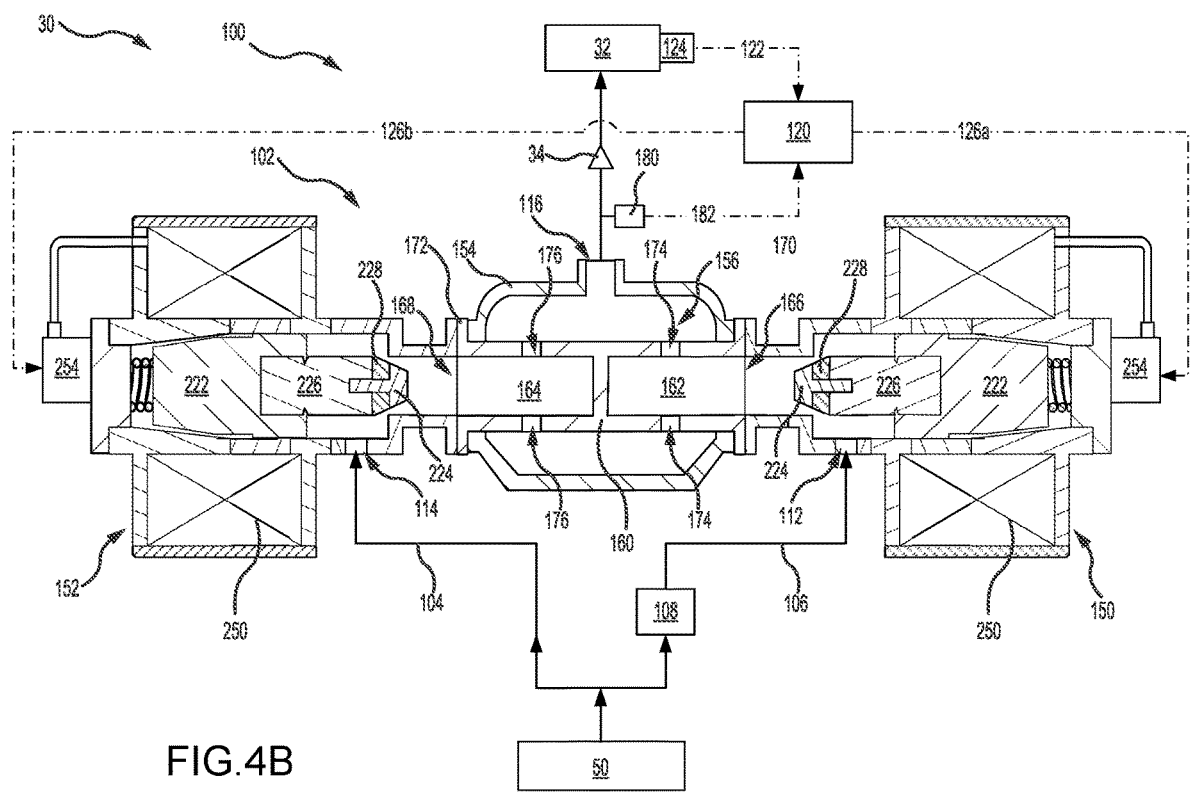
FIG. 4B illustrates a water temperature control system having a thermostat mixing valve that includes dual proportional solenoid valves, with the dual proportional solenoid valves in a fully-open position, in accordance with various embodiments.

With reference to FIGS. 4A and 4B, additional details of water temperature control system 100 and thermostat mixing valve 102 are illustrated. In accordance with various embodiments, thermostat mixing valve 102 includes a first (or hot water) proportional solenoid valve (PSV) 150 and a second (or cold water) PSV 152. In FIG. 4A, first PSV 150 and second PSV 152 are both in a closed state. In FIG. 4B, first PSV 150 and second PSV 152 are both in a fully-open state. Controller 120 controls first PSV 150 and second PSV 152. In this regard, controller 120 sends first commands 126a to first PSV 150 and second commands 126b to second PSV 152. As described in further detail below, first commands 126a are configured to control the flow rate (e.g., volume of water per unit of time) of water output from first PSV 150, and second commands 126b are configured to control the flow rate of water output from second PSV 152.

First and second PSVs 150, 152 are each fluidly coupled to a mixing chamber 154 of thermostat mixing valve 102. Fluid output from first PSV 150 and fluid output from second PSV 152 mix together within mixing chamber 154. For example, mixing chamber 154 may define a chamber volume 156. Fluid flowing through first PSV 150 and fluid flowing through second PSV 152 mix together in chamber volume 156. The fluid mixture is output from chamber volume 156 via outlet 116. Mixing chamber 154 may define outlet 116.

In various embodiments, mixing chamber 154 may include a valve manifold 160. Valve manifold 160 defines a first fluid channel 162 and a second fluid channel 164. First fluid channel 162 is fluidly coupled to an outlet 166 first PSV 150. Second fluid channel 164 is fluidly coupled to an outlet 168 of second PSV 152. A first end 170 of valve manifold 160 may be attached to first PSV 150. A second end 172 of valve manifold 160 may be attached to second PSV 152. Valve manifold 160 may define a plurality of first openings 174 fluidly coupling first fluid channel 162 and chamber volume 156. Valve manifold 160 may define a plurality of second openings 176 fluidly coupling second fluid channel 164 and chamber volume 156. When first PSV 150 is in an open state (e.g., a partially open state or a fully-open-state), fluid may flow from hot water conduit 106, into inlet 112, out outlet 166, into first fluid channel 162, through first openings 174, and into chamber volume 156. When second PSV 152 is in an open state (e.g., a partially open state or a fully-open-state), fluid may flow from cold water conduit 104, into inlet 114, out outlet 168, into second fluid channel 164, through second openings 176, and into chamber volume 156.

In accordance with various embodiments, controller 120 is in electrical communication with a temperature sensor 180. Temperature sensor 180 is configured to measure a temperature of the water output from outlet 116. Temperature sensor 180 sends measured temperature signals 182 corresponding to the temperature of the water output from outlet 116 to controller 120. Controller 120 compares the measured temperature signal 182 to the desired temperature signal 122 received from temperature input device 124. Controller 120 determines first command 126a and second command 126b based on the comparison of measured temperature signal 182 to desired temperature signal 122. For example, if measured temperature signal 182 is less than desired temperature signal 122 controller 120 may adjust the flow rate of hot water from first PSV 150 and/or the flow rate of cold water from second PSV 152.

Figure 5A:
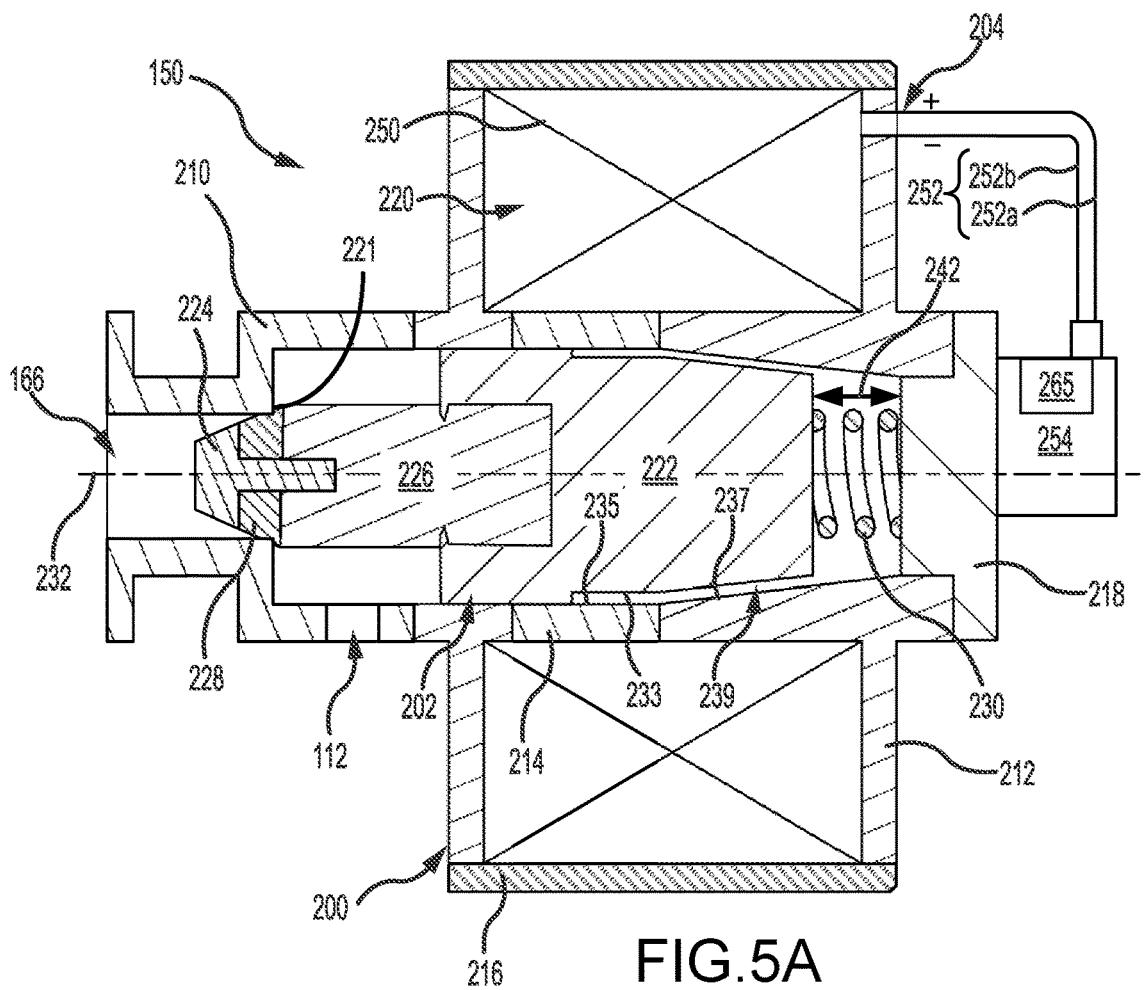
FIGS. 5A and 5B illustrate a proportional solenoid valve in a closed position, in accordance with various embodiments.
Figure 5B:
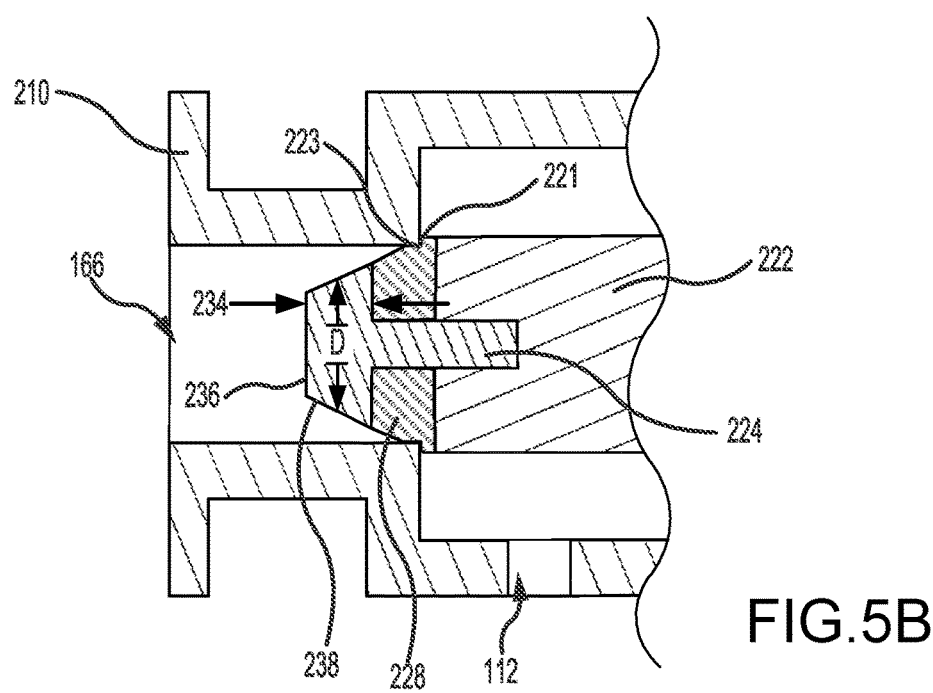
Figure 6A:
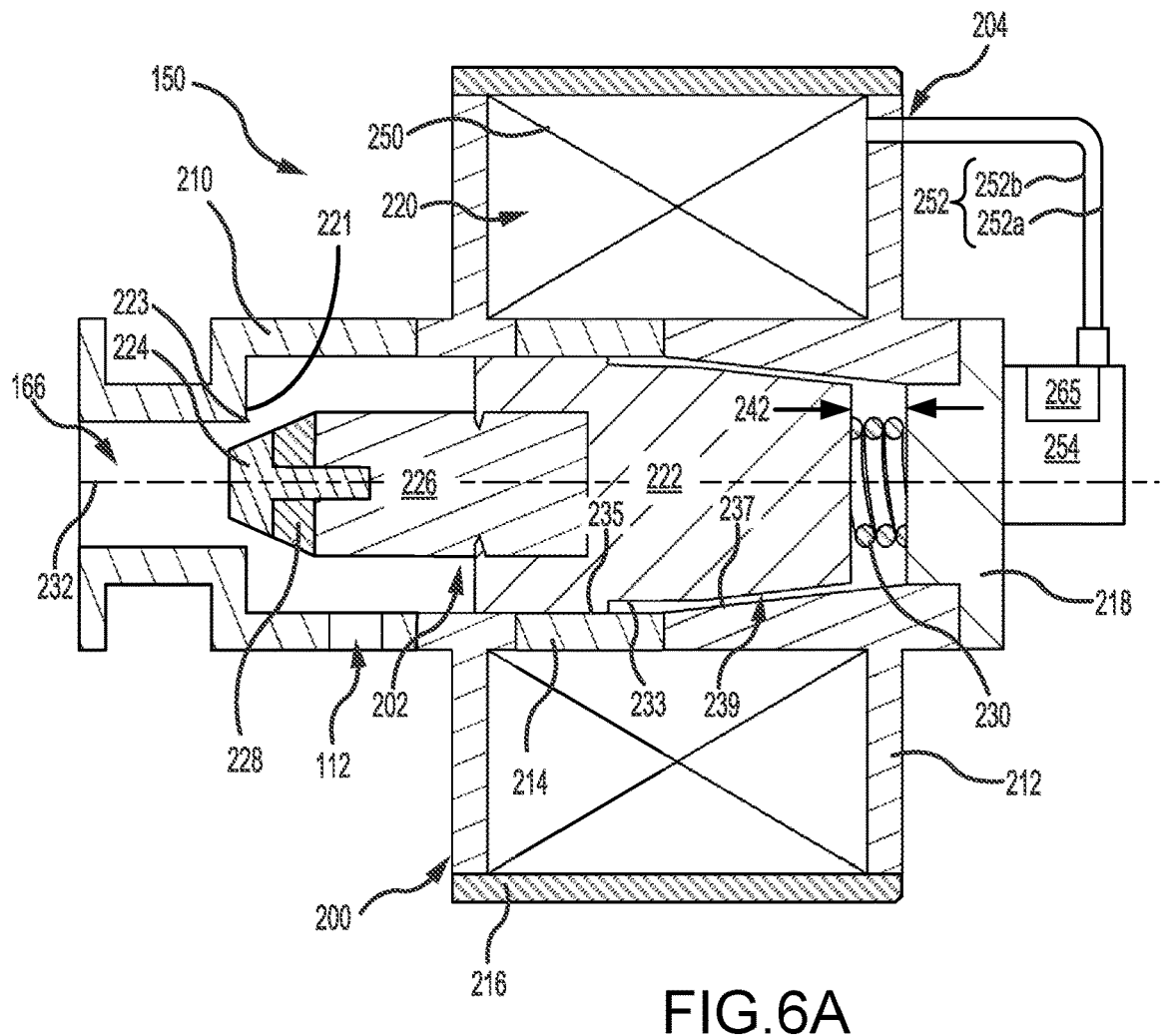
FIGS. 6A and 6B illustrate a proportional solenoid valve in a fully-open position, in accordance with various embodiments.
Figure 6B:
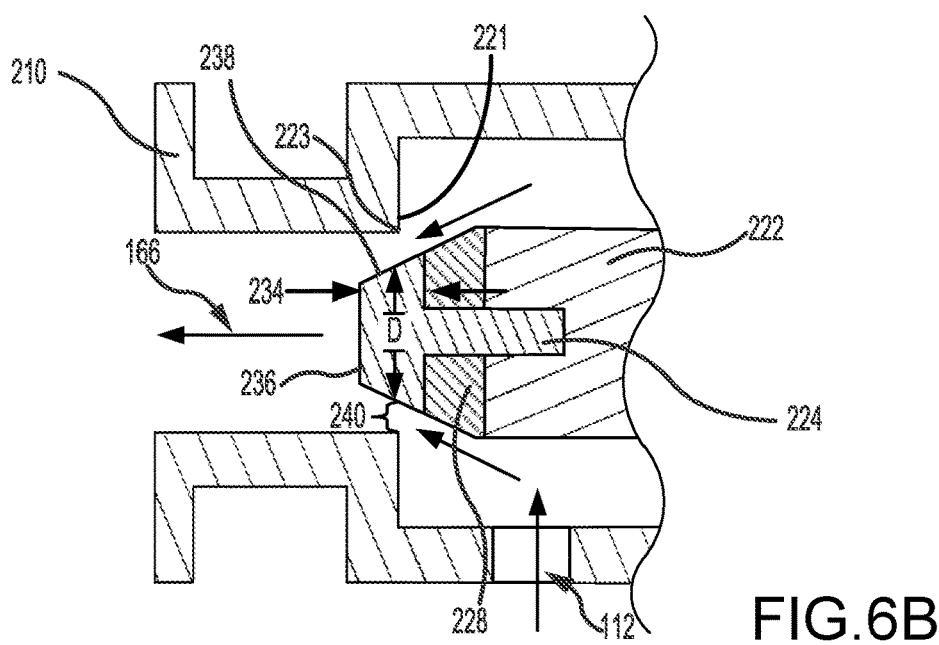

With reference to FIGS. 5A, 5B, 6A, and 6B, additional details of first PSV 150 are illustrated. While FIGS. 5A, 5B, 6A, and 6B illustrate first PSV 150, it is contemplated and understood that second PSV 152, in FIGS. 4A and 4B, is a mirror image of first PSV 150 and includes the features and functionalities described herein with reference to first PSV 150. FIGS. 5A and 5B illustrate first PSV 150 in the closed state. FIGS. 6A and 6B illustrate first PSV 150 in the fully-open state.

In accordance with various embodiments, first PSV 150 includes a housing assembly 200, a plunger assembly 202, and a coil assembly 204. Housing assembly 200 includes non-moving structures of first PSV 150, plunger assembly 202 includes moving structures of first PSV 150, and coil assembly 204 includes electrical structures of first PSV 150.

In accordance with various embodiments, housing assembly 200 may include a valve housing 210, a coil housing 212, a coil fitting 214, a coil cover 216, and a bobbin 218. Valve housing 210 may define inlet 112 and outlet 166 of first PSV 150. Coil housing 212, coil fitting 214, and coil cover 216 may define a coil chamber 220. Bobbin 218 may be coupled to coil housing 212. Coil housing 212 may be coupled to valve housing 210. Valve housing 210 may be coupled to mixing chamber 154 (FIGS. 4A, 4B) and valve manifold 160 (FIGS. 4A, 4B). Valve housing 210 may include (e.g., define) a seal seat 221.

In accordance with various embodiments, plunger assembly 202 may include a plunger 222, a poppet 224, a poppet holder 226, a seal 228, and a biasing member 230. Poppet holder 226 couples poppet 224 to plunger 222, such that poppet 224 translates with plunger 222. Seal 228 is coupled to poppet 224. Seal 228 may comprise an annular geometry and may be located around poppet 224. In various embodiments, a shape of an outer surface 233 of plunger 222 and an inner surface 235 of coil fitting 214 and an inner surface 237 of coil housing 212 create a working air gap 239 between plunger 222 and coil fitting 214 and between plunger 222 and coil housing 212.

In various embodiments, at least one portion of the plunger assembly 202 is magnetic. For example, plunger 222 may be magnetic (e.g., formed of a ferrous material), with poppet 224, poppet holder 226, and seal 228 being made from non-magnetic materials. In various embodiments, plunger 222, poppet 224, and poppet holder 226 may all be magnetic. The plunger assembly 202 includes a longitudinal axis 232 along which the plunger assembly 202 translates (also referred to herein as a linear translation axis or a movement axis) during operation/actuation of first PSV 150. Seal 228 may comprise a resilient, elastomeric material such as, for example, rubber, synthetic rubber, silicone, and/or the like. In this regard, seal 228 may deform in response to biasing member 230 forcing seal 228 into contact with seal seat 221 of valve housing 210. Seal 228 forms a fluid tight seal (i.e., a sealing interface) with seal seat 221, thereby fluidly sealing inlet 112 from outlet 166. The sealing interface formed between seal seat 221 and seal 228 prevents fluid from hot water conduit 106 (FIG. 4A) from flowing into mixing chamber 154. Forming the sealing interface with seal 228, as opposed to poppet 224, allows seal 228 to be replaced without having to replace other features of first PSV 150, should the fluid tight seal begin to degrade (e.g., begin to allow leakage in the closed position).

In various embodiments, an edge 223 of seal seat 221 may be oriented at about a 90° angle. As used in the previous context only, "about" means±5°. An end portion 234 of poppet 224 may have a generally conical or frustoconical shape. End portion 234 of poppet 224 is located opposite plunger 222 and biasing member 230. In this regard end portion 234 is located closer to outlet 166 as compared to plunger 222 and biasing member 230. A diameter D (FIG. 5B) of end portion 234 increases in a direction toward plunger 222 and biasing member 230. Stated differently, diameter D decreases toward an axial end 236 of poppet 224. Diameter D is measured at an outer circumferential surface 238 of poppet 224. The decrease in diameter D of end portion 234 increases a flow area 240 (FIG. 6B), defined between outer circumferential surface 238 of poppet 224 and edge 223 of seal seat 221, as first PSV 150 translates between the closed position and fully-open position. In this regard, as poppet 224 translates toward bobbin 218 (e.g., as a stroke 242 decreases) flow area 240 increases, thereby increasing the flow rate of first PSV 150 at outlet 166. Similarly, as poppet 224 translates away from bobbin 218 (e.g., as a stroke 242 increases) flow area 240 decreases, thereby decreasing the flow rate of first PSV 150 at outlet 166.

In accordance with various embodiments, coil assembly 204 includes one or more solenoid coil(s) 250, a set of lead wires 252 (e.g., a positive lead wire 252a and a ground lead wire 252b), and a solenoid electronics unit 254. Solenoid coil 250 is wrapped helically around coil housing 212, coil fitting 214, and longitudinal axis 232. Lead wires 252 are electrically coupled to solenoid coil 250 and solenoid electronics unit 254. Solenoid electronics unit 254 is configured to control the current and/or voltage provided to solenoid coil 250. Applying current to the solenoid coil 250 generates a magnetic field. The magnetic field magnetically induces movement of the plunger assembly 202 toward bobbin 218.

Solenoid electronics unit 254 is configured to receive first commands 126a (FIGS. 4A, 4B) from controller 120, and convert the commands into a pulse width modulation (PWM) voltage signal, which is provided to solenoid coil 250. The PWM voltage signal allows solenoid electronics unit 254 to control the power supplied to solenoid coil 250. For example, solenoid electronics unit 254 controls the average value of voltage (and current) supplied to solenoid coil 250 by translating a power switch 265 of the solenoid electronics unit 254 between an on-state and an off-state at a rate, or duty cycle, determined by (i.e., corresponding to) the first command 126a received from controller 120. For example, in the on-state, solenoid electronics unit 254 may close a circuit connecting lead wires 252 to a power supply. In the off-state, the circuit may be open, such that lead wires 252 are disconnected from the power supply. Stated differently, in the on-state, solenoid coil is electrically connected to a power supply and current is supplied to solenoid coil 250. In the off-state, solenoid coil 250 is electrically disconnected from the power supply. The duty cycle represents the proportion of time the power switch 265 is in the on-state relative to cycle duration. The greater the duty cycle (i.e., the longer the power switch 265 is in the on-state, as compared to the off-state) the greater the total power supplied to the solenoid coil 250. In accordance with various embodiments, first PSV 150 is a closed valve when solenoid coil 203 is not energized. In this regard, when zero current is supplied to solenoid coil 203 (i.e., a 0% duty cycle), biasing member 230 forces plunger assembly 202 into the closed position, wherein the sealing interface is formed between seal 228 and seal seat 221. In the closed position, stroke 242 is at its greatest length, seal 228 is forced into contact with seal seat 221, and the flow rate through outlet 116 is zero. At a 100% duty cycle, stroke 242 is at a minimum stroke length (e.g., biasing member 230 is fully compressed), and area 240 between the outer circumferential surface 238 of poppet 224 and edge 223 is at a maximum, thereby allowing for the greatest flow rate through outlet 166. In this regard, a 100% duty cycle corresponds to first PSV 150 being in a fully-open position, and a 0% duty cycle corresponds to first PSV 150 being in a closed position. Duty cycles between 0% and 100% translate first PV 150 to corresponding partially opened states and proportionally change the flow rate through outlet 166. For example, a duty cycle of 50% translates plunger 222 and poppet 224 to a position where the area 240 between the outer circumferential surface 238 of poppet 224 and edge 223 of seal seat 221 produces a flow rate of 50% of the flow rate in the fully-open position. A duty cycle of 75% translates plunger 222 and poppet 224 to a position, where the area 240 between outer circumferential surface 238 of poppet 224 and edge 223 of seal seat 221 produces a flow rate of 75% of the flow rate in the fully open position.

Returning to FIGS. 4A and 4B, controller 120 determines a first duty cycle for first PSV 150 and a second duty cycle for second PSV 152 based on the comparison of measured temperature signal 182 to desired temperature signal 122. Controller 120 sends first command 126a, which corresponds to the first duty cycle, to solenoid electronics unit 254 of first PSV 150. In response to receiving first command 126a, solenoid electronics unit 254 of first PSV 150 generates the PWM voltage signal corresponding the first duty cycle (i.e., generates the PWM voltage signal based on first command 126a). Controller 120 sends second command 126b, which corresponds to the second duty cycle, to solenoid electronics unit 254 of second PSV 152. In response to receiving second command 126b, solenoid electronics unit 254 of second PSV 152 generates the PWM voltage signal corresponding the second duty cycle (i.e., generates the PWM voltage signal based on second command 126b). Controller 120 may control first PSV 150 and second PSV 152 independently of one another. For example, a sum of the first duty cycle and the second duty cycle may not equal 100%. For example, in response to the comparison of measured temperature signal 182 to desired temperature signal 122, controller 120 may determine to send a first command 126a configured to produce a first duty cycle of 80% for first PSV 150 and to send a second command 126b configured to produce a second duty cycle of 60% for second PSV 152. Or controller 120 may determine to send a first command 126a corresponding to a first duty cycle of 50% for first PSV 150 and to send a second command 126b corresponding to a second duty cycle of 0% for second PSV 152. Having a first PSV 150 controlling the flow rate of hot water and a second PSV 152 controller the flow rate of cold water (i.e., having dual PSVs) tends to allow for more precise control of the temperature of the water provided to faucet nozzle 32.

Figure 7:
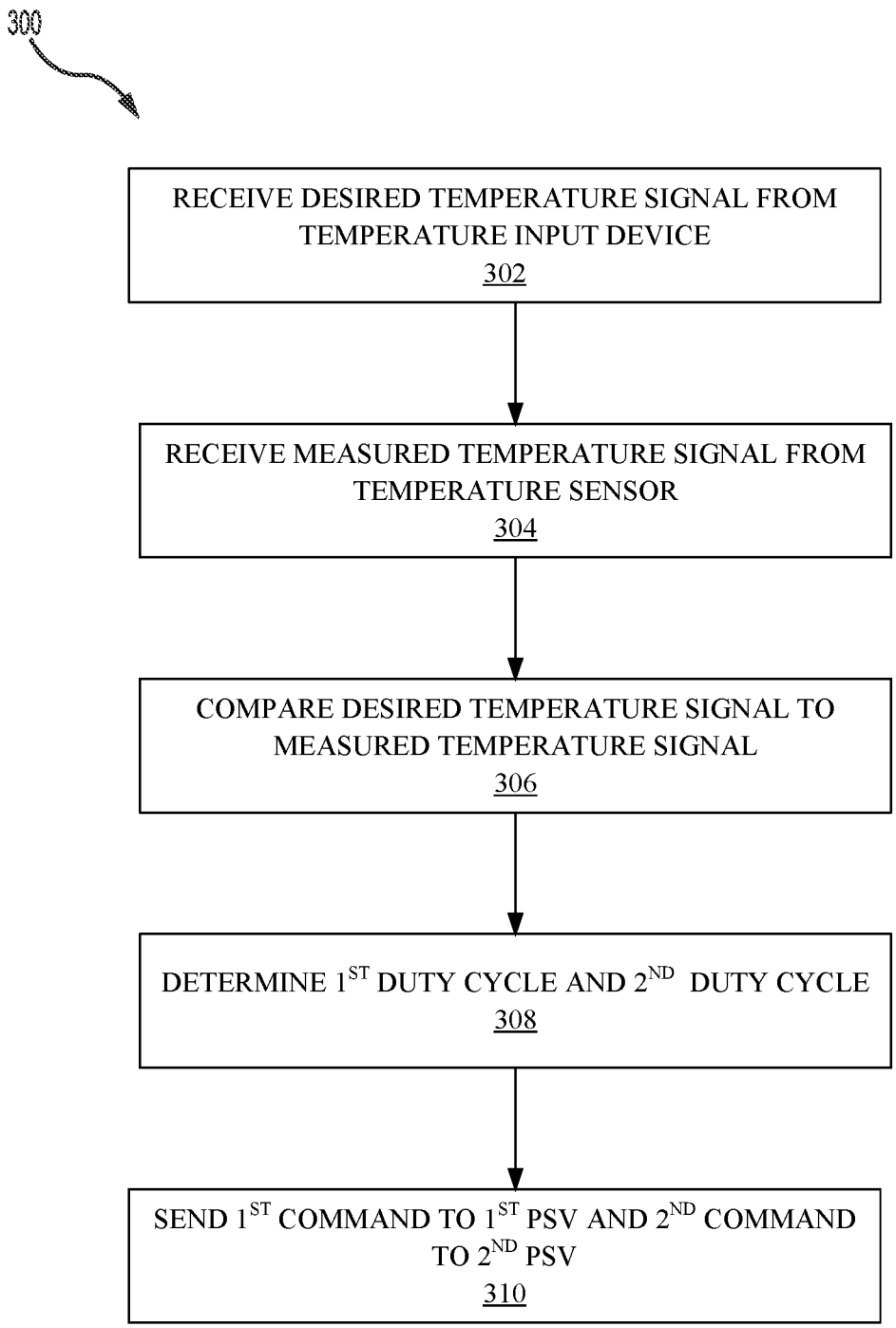
FIG. 7 illustrates a flow chart for controlling a water temperature output from thermostat mixing valve having dual proportional solenoid valves, in accordance with various embodiments.

With reference to FIG. 7, a process 300 for controlling a temperature of water output from a thermostat mixing valve. In accordance with various embodiment, process 300 may include receiving a desired temperature signal from a temperature input device (step 302), receiving a measured temperature signal from a temperature sensor (step 304), and comparing the desired temperature signal to the measured temperature signal (step 306). Process 300 may further include determining a first duty cycle for a first proportional solenoid valve of the thermostat mixing valve and a second duty cycle for a second proportional solenoid valve of the thermostat mixing valve based on the comparison of the desired temperature signal to the measured temperature signal (step 308), and sending a first command corresponding to the first duty cycle to the first proportional solenoid valve and a second command corresponding to the second duty cycle to the second proportional solenoid valve (step 310).

With combined reference to FIG. 4A and FIG. 7, process 300 may be carried out by water temperature control system 100 and controller 120, as described above. In various embodiments, step 302 may include controller 120 receiving desired temperature signal 122 from temperature input device 124. Step 304 may include controller 120 receiving measured temperature signal 182 from temperature sensor 180. Step 306 may include controller 120 comparing desired temperature signal 122 to the measured temperature signal 182). Step 308 may include controller 120 determining a first duty cycle for first PSV 150 of thermostat mixing valve 102 and a second duty cycle for second PSV 152 of thermostat mixing valve 102 based on the comparison of desired temperature signal 122 to measured temperature signal 182. Stated differently, step 308 may include controller 120 determining a first flow rate for first PSV 150 and a second flow rate for second PSV 152 based on the comparison of desired temperature signal 122 to measured temperature signal 182, with the first duty cycle being configured to generate the first flow rate and the second duty cycle being configured to generate the second flow rate. Step 310 may include controller 120 sending first command 126a, corresponding to the first duty cycle, to first PSV 150, and sending second command 126b, corresponding to the second duty cycle, to second PSV 152.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thermostat mixing valve for a water temperature control system, the thermostat mixing valve comprising:
a mixing chamber defining a valve outlet;
a first proportional solenoid valve fluidly coupled to the mixing chamber; and
a second proportional solenoid valve fluidly coupled to the mixing chamber, wherein each of the first proportional solenoid valve and the second proportional solenoid valve includes:
a housing assembly defining a fluid inlet and a fluid outlet;
a plunger assembly configured to translate relative to the housing assembly, the plunger assembly including:
a plunger;
a poppet holder coupled to the plunger such that a portion of the poppet holder extends into the plunger and such that a portion of the plunger surrounds a portion of the poppet holder;
a poppet coupled to the poppet holder such that a portion of the poppet extends through a seal, the seal having an annular geometry and located around the poppet, and into the poppet holder such that a portion of the poppet holder surrounds a portion of the poppet, the poppet including an end portion including at least one of a frustoconical shape or a conical shape; and
a biasing member configured to bias the plunger toward the fluid outlet; and
a coil assembly configured to generate a magnetic field, the magnetic field being configured to translate the plunger assembly.

2. The thermostat mixing valve of claim 1, wherein the plunger comprises a ferrous material.

3. The thermostat mixing valve of claim 1, wherein the housing assembly includes a valve housing and a coil housing, the valve housing including a seal seat, and wherein the coil assembly includes a solenoid coil helically wrapped around the coil housing.

4. The thermostat mixing valve of claim 3, wherein the seal seat is configured to form a fluid tight seal with the seal of the plunger assembly.

5. The thermostat mixing valve of claim 1, wherein the mixing chamber includes a valve manifold fluidly coupled to the first proportional solenoid valve and to the second proportional solenoid valve.

6. The thermostat mixing valve of claim 5, wherein the valve manifold defines:
a first fluid channel fluidly coupled to the fluid outlet of the first proportional solenoid valve;
a second fluid channel fluidly coupled to the fluid outlet of the second proportional solenoid valve;
a plurality of first openings fluidly coupling the first fluid channel to a mixing volume defined by the mixing chamber; and
a plurality of second openings fluidly coupling the second fluid channel to the mixing volume.

7. A water temperature control system for an aircraft faucet system, the water temperature control system comprising:
a thermostat mixing valve including a mixing chamber, a first proportional solenoid valve fluidly coupled to the mixing chamber, and a second proportional solenoid valve fluidly coupled to the mixing chamber, wherein each of the first proportional solenoid valve and the second proportional solenoid valve includes:
a housing assembly defining a fluid inlet and a fluid outlet;
a plunger assembly configured to translate relative to the housing assembly, the plunger assembly including:
a plunger;
a poppet holder coupled to the plunger such that a portion of the poppet holder extends into the plunger and such that a portion of the plunger surrounds a portion of the poppet holder;
a poppet coupled to the poppet holder such that a portion of the poppet extends through a seal, the seal having an annular geometry and located around the poppet, and into the poppet holder such that a portion of the poppet holder surrounds a portion of the poppet, the poppet including an end portion including at least one of a frustoconical shape or a conical shape; and
a biasing member configured to bias the plunger toward the fluid outlet;
a controller operably coupled to the first proportional solenoid valve and the second proportional solenoid valve;
a temperature sensor configured to measure a temperature of water output from the thermostat mixing valve and send a measured temperature signal to the controller; and
a temperature input device configured to send a desired temperature signal to the controller, wherein the controller is configured to determine a first command to send to the first proportional solenoid valve and a second command to send to the second proportional solenoid valve based on a comparison of the desired temperature signal to the measured temperature signal.

8. The water temperature control system, of claim 7, wherein the housing assemblies each define a seal seat, and wherein the fluid outlets are each fluidly coupled to the mixing chamber, and wherein each of the first proportional solenoid valve and the second proportional solenoid valve further includes: a coil assembly configured to generate a magnetic field, the magnetic fields each being configured to translate the plunger assembly.

9. The water temperature control system of claim 8, wherein the plungers each comprise a ferrous material.

10. The water temperature control system of claim 9, wherein an edge of the seal seat is configured to deform the seal and form a first sealing interface with the seal.

11. The water temperature control system of claim 10, wherein the coil assembly includes: a solenoid coil; and a solenoid electronics unit configured to receive the first command and control a pulse width modulated voltage signal provided to the solenoid coil, wherein the first command corresponds to a first duty cycle.

12. The water temperature control system of claim 11, wherein increasing the first duty cycle increases an area defined between the edge of the seal seat and an outer circumferential surface of the poppet.

13. An article of manufacture, comprising:
a first proportional solenoid valve;
a second proportional solenoid valve, wherein each of the first proportional solenoid valve and the second proportional solenoid valve comprises:
a housing assembly defining a fluid inlet, a fluid outlet, and a seal seat;
a plunger comprising a ferrous material;
a poppet holder coupled to the plunger such that a portion of the poppet holder extends into the plunger and such that a portion of the plunger surrounds a portion of the poppet holder;
a poppet coupled to the poppet holder such that a portion of the poppet extends through a seal, the seal having an annular geometry and located around the poppet, and into the poppet holder such that a portion of the poppet holder surrounds a portion of the poppet, the poppet including an end portion including at least one of a frustoconical shape or a conical shape;
a controller; and
a tangible, non-transitory computer-readable storage medium having instructions stored thereon for controlling a temperature of water output from a thermostat mixing valve and that, in response to execution by the controller, cause the controller to perform operations comprising:
receiving, by the controller, a desired temperature signal from a temperature input device;
receiving, by the controller, a measured temperature signal from a temperature sensor, the temperature sensor being configured to measure the temperature of the water output from the thermostat mixing valve;
comparing, by the controller, the desired temperature signal to the measured temperature signal;
determining, by the controller, a first duty cycle for the first proportional solenoid valve of the thermostat mixing valve and a second duty cycle for the second proportional solenoid valve of the thermostat mixing valve;
sending, by the controller, a first command corresponding to the first duty cycle to the first proportional solenoid valve; and sending, by the controller, a second command corresponding to the second duty cycle to the second proportional solenoid valve.

14. The article of claim 13, wherein each of the first proportional solenoid valve and the second proportional solenoid valve further comprises:
a biasing member configured to bias the seal toward the seal seat; and
a coil assembly configured to generate a magnetic field, the magnetic field being configured to translate the plunger.

15. The article of claim 14, wherein increasing the first duty cycle increases an area between an edge of the seal seat of the first proportional solenoid valve and an outer circumferential surface of the poppet of the first proportional solenoid valve, and wherein decreasing the first duty cycle decreases the area between the edge of the seal seat of the first proportional solenoid valve and the outer circumferential surface of the poppet of the first proportional solenoid valve.

16. The article of claim 15, increasing the second duty cycle increases an area between an edge of the seal seat of the second proportional solenoid valve and an outer circumferential surface of the poppet of the second proportional solenoid valve, and wherein decreasing the second duty cycle decreases the area between the edge of the seal seat of the second proportional solenoid valve and the outer circumferential surface of the poppet of the second proportional solenoid valve.

* * * * *